(12) United States Patent
Yilmaz

(10) Patent No.: US 10,831,317 B2
(45) Date of Patent: Nov. 10, 2020

(54) ELECTRONIC INK TOUCH SENSITIVE DISPLAY

(75) Inventor: Esat Yilmaz, Chandler's Ford (GB)

(73) Assignee: Neodrón Limited, Dublin (IE)

( * ) Notice: Subject to any disclaimer, the term of this patent is extended or adjusted under 35 U.S.C. 154(b) by 175 days.

(21) Appl. No.: 12/859,874

(22) Filed: Aug. 20, 2010

(65) Prior Publication Data

US 2012/0044190 A1 Feb. 23, 2012

(51) Int. Cl.
| | |
|---|---|
| G06F 3/041 | (2006.01) |
| G06F 3/045 | (2006.01) |
| G06F 3/044 | (2006.01) |
| G09G 3/34 | (2006.01) |
| G02F 1/167 | (2019.01) |

(52) U.S. Cl.
CPC .......... *G06F 3/044* (2013.01); *G06F 3/0412* (2013.01); *G02F 1/167* (2013.01); *G06F 2203/04112* (2013.01); *G09G 3/344* (2013.01); *H01H 2219/0023* (2013.01)

(58) Field of Classification Search
CPC ............ G06F 3/044; G06F 3/0412; G06F 2203/04112; G02F 1/167; H01H 2219/0023; G09G 3/344
USPC ........................................................ 345/173
See application file for complete search history.

(56) References Cited

U.S. PATENT DOCUMENTS

| | | | |
|---|---|---|---|
| 4,814,760 A * | 3/1989 | Johnston | G06F 3/0412 178/18.01 |
| 6,995,550 B2 * | 2/2006 | Jacobson et al. | 324/71.1 |
| 7,663,607 B2 | 2/2010 | Hotelling | |
| 7,864,503 B2 | 1/2011 | Chang | |
| 7,875,814 B2 | 1/2011 | Chen | |
| 7,920,129 B2 | 4/2011 | Hotelling | |
| 8,031,094 B2 | 10/2011 | Hotelling | |
| 8,031,174 B2 | 10/2011 | Hamblin | |
| 8,040,326 B2 | 10/2011 | Hotelling | |
| 8,049,732 B2 | 11/2011 | Hotelling | |
| 8,179,381 B2 | 5/2012 | Frey | |
| 8,217,902 B2 | 7/2012 | Chang | |

(Continued)

FOREIGN PATENT DOCUMENTS

| | | | | |
|---|---|---|---|---|
| WO | WO 2009/131292 | * | 12/2008 | ............. 345/173 |
| WO | WO 2010/110807 | * | 3/2009 | ............. G02F 1/167 |

(Continued)

OTHER PUBLICATIONS

U.S. Appl. No. 61/454,936, filed Mar. 21, 2011, Myers.

(Continued)

*Primary Examiner* — Patrick N Edouard
*Assistant Examiner* — Douglas M Wilson
(74) *Attorney, Agent, or Firm* — Shami Messinger PLLC

(57) ABSTRACT

An electronic ink display incorporating a touch sensitive screen which does not significantly increase the thickness of the electronic ink display as compared to conventional touch screen displays. The touch screen has a first and second electrode layers each having electrodes arranged to form nodes where the electrodes overlap. The electronic ink display contains microcapsules having different positively and negatively charged inks of different colors which are attracted the oppositely charged electrode to form an image.

7 Claims, 4 Drawing Sheets

(56) References Cited

U.S. PATENT DOCUMENTS

| | | | |
|---|---|---|---|
| 8,581,860 B2* | 11/2013 | Meng | G06F 3/044 |
| | | | 178/18.06 |
| 8,624,845 B2* | 1/2014 | Grivna | G06F 3/041 |
| | | | 345/104 |
| 8,723,824 B2 | 5/2014 | Myers | |
| 9,244,559 B2 | 1/2016 | Yilmaz | |
| 2008/0012835 A1 | 1/2008 | Rimon | |
| 2008/0048989 A1* | 2/2008 | Yoon et al. | 345/173 |
| 2008/0062139 A1* | 3/2008 | Hotelling | G02F 1/13338 |
| | | | 345/173 |
| 2008/0062147 A1 | 3/2008 | Hotelling et al. | |
| 2008/0143689 A1* | 6/2008 | Foo | G06F 3/0416 |
| | | | 345/174 |
| 2008/0238894 A1* | 10/2008 | Ng | G09G 3/344 |
| | | | 345/204 |
| 2008/0309627 A1 | 12/2008 | Hotelling | |
| 2008/0309635 A1 | 12/2008 | Matsuo | |
| 2009/0109522 A1* | 4/2009 | Paolini et al. | 359/296 |
| 2009/0315854 A1 | 12/2009 | Matsuo | |
| 2010/0044122 A1* | 2/2010 | Sleeman | H05K 1/0296 |
| | | | 178/18.06 |
| 2010/0045632 A1* | 2/2010 | Yilmaz | G01D 5/2405 |
| | | | 345/174 |
| 2010/0079384 A1* | 4/2010 | Grivna | G06F 3/044 |
| | | | 345/173 |
| 2010/0148993 A1* | 6/2010 | Lee | G06F 3/044 |
| | | | 341/20 |
| 2010/0149108 A1* | 6/2010 | Hotelling | G06F 3/044 |
| | | | 345/173 |
| 2010/0193257 A1* | 8/2010 | Hotelling | G06F 3/047 |
| | | | 178/18.06 |
| 2010/0194707 A1* | 8/2010 | Hotelling et al. | 345/173 |
| 2010/0238145 A1* | 9/2010 | Muto | G09G 3/3446 |
| | | | 345/204 |
| 2011/0007011 A1* | 1/2011 | Mozdzyn | G06F 3/044 |
| | | | 345/173 |
| 2011/0025635 A1* | 2/2011 | Lee | G06F 1/3203 |
| | | | 345/173 |
| 2011/0025639 A1* | 2/2011 | Trend | G06F 3/044 |
| | | | 345/174 |
| 2011/0031042 A1* | 2/2011 | Wu | G06F 3/0412 |
| | | | 178/18.06 |
| 2011/0038030 A1* | 2/2011 | Roosendaal | G09F 9/372 |
| | | | 359/296 |
| 2011/0109566 A1* | 5/2011 | Meng | G06F 3/044 |
| | | | 345/173 |
| 2011/0109622 A1 | 5/2011 | Son et al. | |
| 2011/0254802 A1* | 10/2011 | Philipp | G06F 3/044 |
| | | | 345/174 |
| 2011/0267305 A1* | 11/2011 | Shahparnia | G06F 3/0412 |
| | | | 345/174 |
| 2011/0310459 A1* | 12/2011 | Gates | G06F 3/0421 |
| | | | 359/296 |
| 2012/0162745 A1* | 6/2012 | Kornilovich | G02F 1/167 |
| | | | 359/296 |
| 2012/0242588 A1 | 9/2012 | Myers | |
| 2012/0242592 A1 | 9/2012 | Rothkopf | |
| 2012/0243151 A1 | 9/2012 | Lynch | |
| 2012/0243719 A1 | 9/2012 | Franklin | |
| 2013/0076612 A1 | 3/2013 | Myers | |
| 2014/0168133 A1 | 6/2014 | Yilmaz | |
| 2016/0077633 A1* | 3/2016 | Van Aerle | G06F 1/1601 |
| | | | 345/174 |
| 2016/0132167 A1 | 5/2016 | Yilmaz | |

FOREIGN PATENT DOCUMENTS

| | | |
|---|---|---|
| WO | WO 2009131292 A1 * | 10/2009 |
| WO | WO-2009131292 A1 * | 10/2009 |
| WO | WO 2009133503 A1 * | 11/2009 ............ G09F 9/37 |
| WO | WO-2009133503 A1 * | 11/2009 |
| WO | WO 2012/129247 | 9/2012 |

OTHER PUBLICATIONS

U.S. Appl. No. 61/454,950, filed Mar. 21, 2011, Lynch.

U.S. Appl. No. 61/454,894, filed Mar. 21, 2011, Rothkopf.

E. Yilmaz, U.S. Appl. No. 13/715,677, Requirement for Restriction/Election dated Jul. 11, 2014.

E. Yilmaz, U.S. Appl. No. 13/715,677, Response to Election/Restriction dated Sep. 11, 2014.

E. Yilmaz, U.S. Appl. No. 13/715,677, Non-final Rejection dated Oct. 9, 2014.

E. Yilmaz, U.S. Appl. No. 13/715,677, Amendment to NFOA dated Feb. 9, 2015.

E. Yilmaz, U.S. Appl. No. 13/715,677, Final Rejection dated Mar. 4, 2015.

E. Yilmaz, U.S. Appl. No. 13/715,677, Response dated May 4, 2015.

E. Yilmaz, U.S. Appl. No. 13/715,677, Notice of Allowance dated Sep. 18, 2015.

E. Yilmaz, U.S. Appl. No. 14/983,064, DIV Patent Application filed Dec. 29, 2015.

E. Yilmaz, U.S. Appl. No. 14/983,064, Preliminary Amendment filed Dec. 30, 2015.

E. Yilmaz, U.S. Appl. No. 14/983,064, Amendment after Non-final Office Action filed Mar. 10, 2017.

E. Yilmaz, U.S. Appl. No. 14/983,064, After Non-final Office Action dated Mar. 29, 2017.

E. Yilmaz, U.S. Appl. No. 14/983,064, Non-final Office Action dated Jul. 8, 2016.

E. Yilmaz, U.S. Appl. No. 14/983,064, Amendment after Non-final Office Action dated Oct. 11, 2016.

E. Yilmaz, U.S. Appl. No. 14/983,064, Non-final Office Action dated Nov. 10, 2016.

* cited by examiner

ELECTRONIC INK TOUCH SENSITIVE DISPLAY

BACKGROUND

A touch sensitive display combines a transparent position sensor with a display device. The position sensor is a device that can detect the presence and location of a touch by or close proximity of a finger or another object, such as a stylus, within a display area of the position sensor overlaid on a display screen. In a touch sensitive display application, the position sensor enables direct interaction with what is displayed on the screen, rather than indirectly with a mouse or touchpad. Position sensors can be attached to or provided as part of computers, personal digital assistants, satellite navigation devices, mobile telephones, portable media players, portable game consoles, public information kiosks, point of sale systems, etc.

There are a number of different types of position sensors/touch screens, such as resistive touch screens, surface acoustic wave touch screens, capacitive touch screens, etc. A capacitive touch screen, for example, may include an insulator and a substrate with a layer of conductive material in particular patterns on one or both surfaces of the substrate. When an object, such as a finger or a stylus, touches or is provided in close proximity to the surface of the screen, there is a change in capacitance. This change in capacitance is sensed by a controller and processed to determine the position of the touch on the screen.

Electronic paper, e-paper or electronic ink display is a display technology designed to mimic the appearance of ordinary ink on paper. Unlike a conventional flat panel display, which uses a backlight to illuminate its pixel elements, electronic paper reflects light like ordinary paper. It is capable of holding text and images indefinitely without drawing electricity while allowing the image to be changed later.

In recent years, electronic ink displays have become widely used. However, incorporating a touch sensitive screen with an electronic ink display increases the thickness of the display.

SUMMARY

The following disclosure describes examples of displays incorporating touch sensitive screens with electronic ink displays.

BRIEF DESCRIPTION OF THE DRAWINGS

The drawings depict one or more implementations in accordance with the present teachings by way of example only, not by way of limitation. In the figures, like reference numerals refer to the same or similar elements.

DETAILED DESCRIPTION

In the following detailed description, numerous specific details are set forth by way of examples in order to illustrate the relevant teachings. In order to avoid unnecessarily obscuring aspects of the present teachings, those methods, procedures, components, and/or circuitry that are well-known to one of ordinary skill in the art have been described at a relatively high-level.

In the examples, an electronic ink display incorporating a touch sensitive screen is described which does not increase the thickness of the electronic ink display as much as conventional electronic ink displays with touch screens. In the examples, at least one set or layer of electrodes is shared for both display and touch sensing functions. In the figures, the adhesive layers are not shown unless they are relevant to the disclosure.

Figure 1:
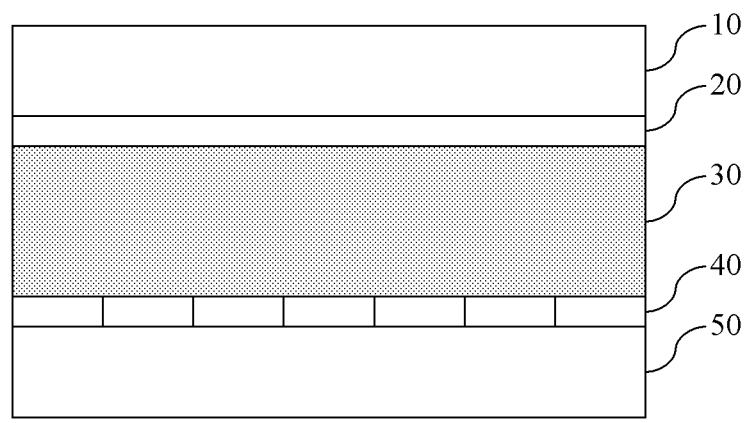
FIG. 1 is a side view of an example of an electronic ink display.

FIG. 1 illustrates schematically a side view of an electronic ink display. The display includes a transparent first substrate 10, a first electrode layer 20, an electronic ink layer 30, a second electrode layer 40 and a second substrate 50. In one example, the first electrode layer 20 is a substantially transparent electrode layer, such as a layer of indium tin oxide (ITO). Alternatively, the first electrode layer 20 is a fine mesh made up of narrow lines of conductive material such as copper or silver. The widths of the lines making up the mesh may be on the order of 1 μm to 20 μm. In other examples, the widths of the lines are on the order of 10 nm to 1 μm. The width of the lines allows for the electrode to be difficult for a user to see. The second electrode layer 40 is a pixel drive electrode layer made up of pixel drive elements with the capability of being individually driven by a display controller (not shown).

Figure 2:
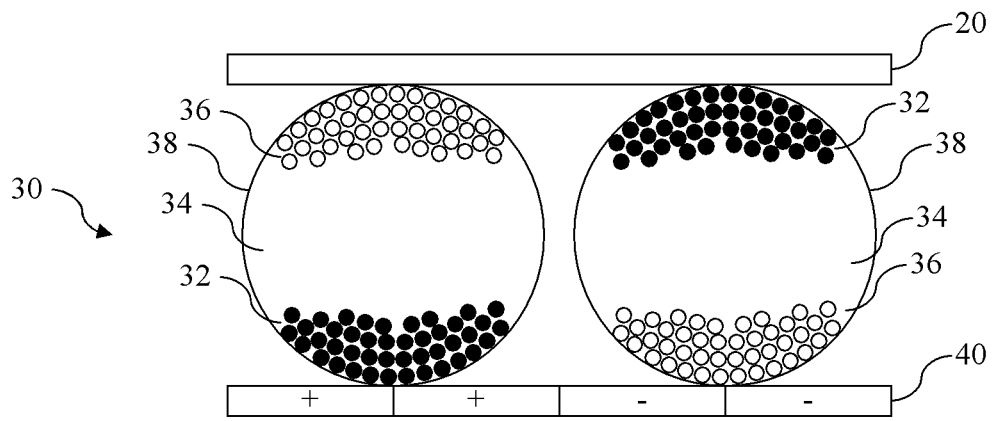
FIG. 2 illustrates schematically an electronic ink layer of an electronic ink display.

The electronic ink layer 30 of FIG. 1 is provided between a first electrode layer 20 and a second electrode layer 40. FIG. 2 illustrates in more detail the electronic ink layer 30. The electronic ink layer 30 includes transparent microcapsules 38 each containing positively charged white particles 36, negatively charged black particles 32 and a transparent fluid 34. In another example, the white particles 36 may be negatively charged, and the black particles 32 may be positively charged. In another example, the particles may be of any color, as long as the positively charged particles are of a different color than the negatively charged particles.

In an example, each transparent microcapsule 38 has a diameter in the range of 18 to 180 μm. The white particles 36 and the black particles 32 are suspended in the transparent fluid 34. The transparent fluid 34 may be any transparent fluid capable of containing the particles and allow the particles to move to either end of the microcapsule 38 when attracted by the electrodes. For example, one suitable fluid is transparent oil.

Referring to FIG. 2, when a voltage that is negative with respect to the voltage applied to the first electrode layer 20 is applied to the second electrode layer 40, the positively charged white particles 36 are attracted to the end of the microcapsules 38 nearest the first electrode layer 20, causing the surface of the microcapsules 38 adjacent to first electrode layer 20 to appear white. At the same time, the negatively charged black particles 32 are pulled to the end of the microcapsules 38 nearest the second electrode layer 40 and are not visible. By reversing the process, the negatively charged black particles 32 are attracted to the end of the microcapsules 38 nearest the first electrode layer 20 to make the surface of the microcapsules 38 appear black and the positively charged white particles 36 are pulled to the end of the microcapsules 38 nearest the second electrode layer 40 where they are not visible.

Figure 3:
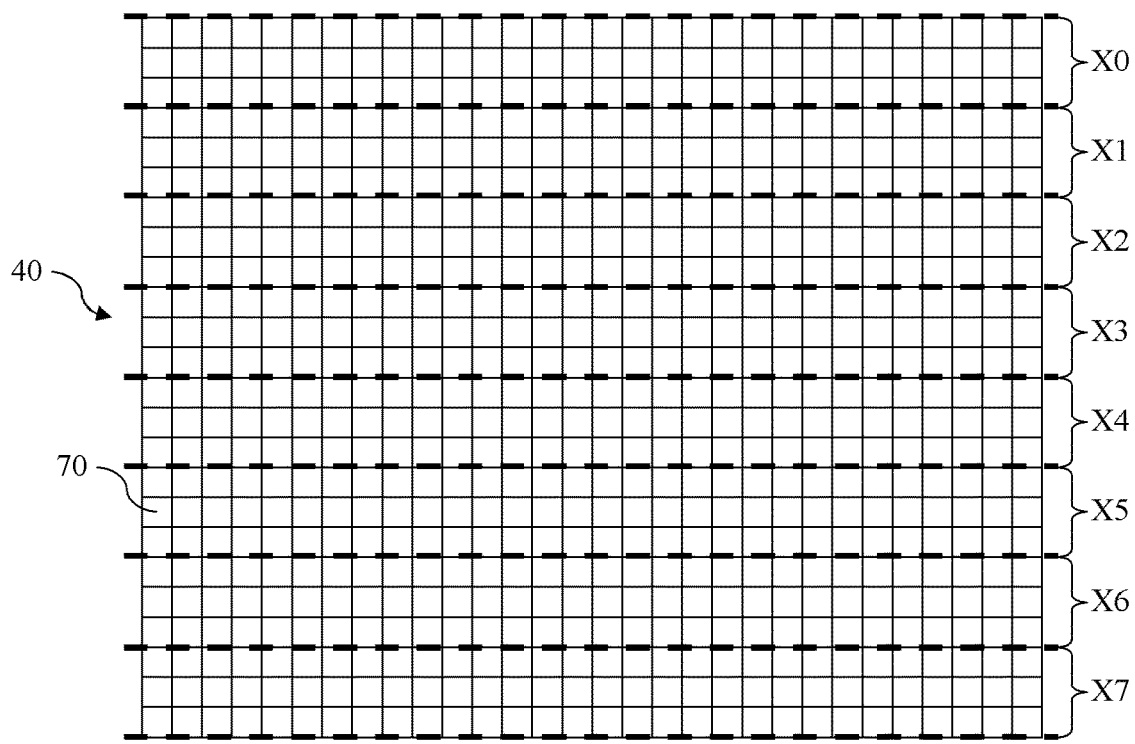
FIG. 3 illustrates schematically a pixel electrode layer.

FIG. 3 shows an exemplary second electrode layer 40. The second electrode layer 40 forms a pattern of pixel electrode elements 70, each of which can then be controlled by a display driver as discussed later. When voltages are applied across the first electrode layer 20 and select the individual pixel elements 70 of the second electrode layer 40, the image being displayed is changed. Individual pixel elements are selected and driven at appropriate voltages to more particles in the adjacent microcapsules to produce desired white and black display pixels in the manner needed to generate a desired image. In one example, a voltage of approximately 25 V is applied for several milliseconds in order to change the image being displayed. Once the displayed image has been changed, no power is required to maintain the image. The image may be maintained for a significant length of time, until power is applied to change the image.

In the example, the electronic ink display is provided with a mutual capacitance type touch sensitive screen. The main components of such a touch sensitive screen are a plurality of drive electrodes and sense electrodes. The drive and sense electrodes are arranged to create nodes where the drive and sense electrodes overlap. A touch sensitive screen is supported by control circuitry connected to the drive and sense electrodes for controlling the drive and sense electrodes.

In this first example, display and touch sensing operations share use of the electrode layers 20 and 40. When voltage to change a display state is not being applied, the electrodes of the layers are used for touch sensing, and vice versa.

In order to provide an electronic ink display with a touch sensitive screen, the pixel elements of the second electrode layer 40 are grouped together to create a plurality of drive electrodes so that they can be pulsed at the same time by their corresponding pixel drivers to serve as drive electrodes for the capacitive sensing function. In the example shown in FIG. 3, the plurality of pixel elements 70 are grouped together to create drive electrodes X0 to X7, resulting in each drive electrode having 90 pixel elements 70. However, a drive electrode may include as few or as many pixel elements as required depending on the desired size and use of the touch screen. The grouping is done by controlling the drivers for all the pixel elements in the row to apply the voltage for sensing simultaneously. It is possible to drive each pixel element separately in order to create a high resolution touch sensor. Alternatively, several pixel elements may be grouped together and treated as one drive electrode, i.e., X0 to X7 of FIG. 3. Although the pixel elements are grouped together to form separate drive electrodes X0 to X7, there is no physical separation between each touch sensing drive electrode. The grouping is performed for ease of driving.

Figure 4:
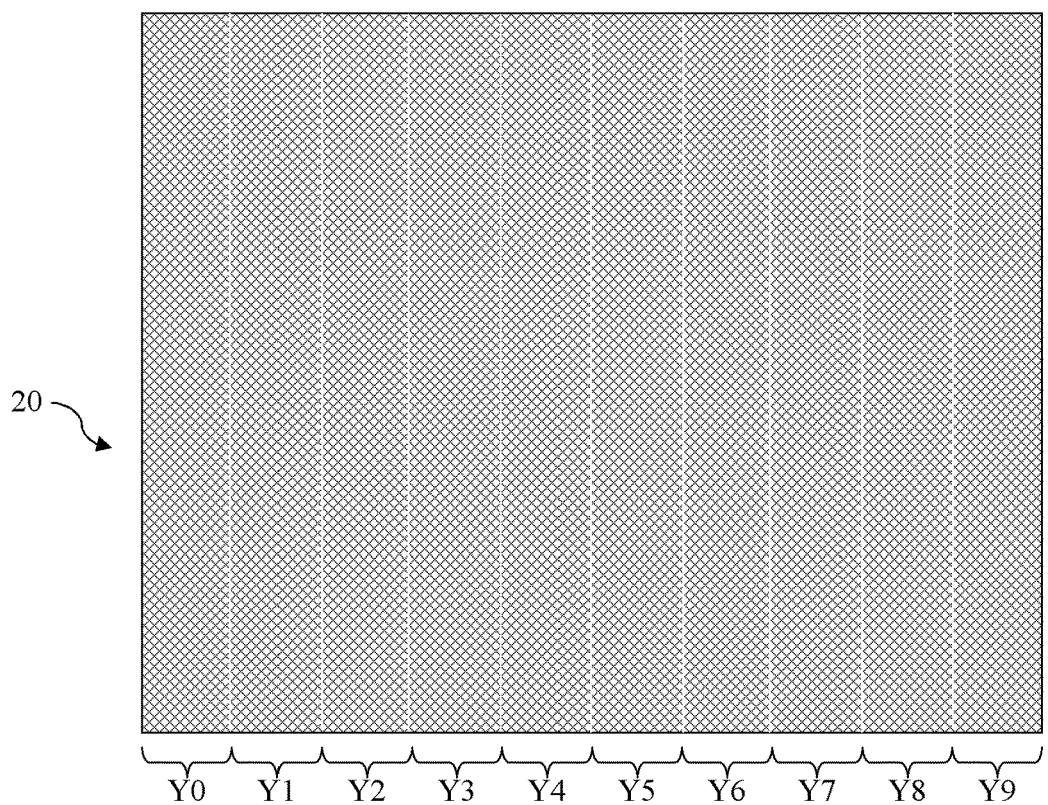
FIG. 4 illustrates schematically a patterned electrode layer.

As shown in FIG. 4, the first electrode layer 20 may be a layer of fine mesh made up of narrow lines of a conductive material patterned to create a plurality of sense electrodes Y0 to Y9. In order for the display to function as an electronic ink display, the sense electrode pattern which is applied to the first electrode layer provides substantially full coverage of the electronic ink layer 30. If there are areas of the first electrode layer 20 which do not have ample coverage, then these insufficiently covered areas of the electronic ink layer 30 are not altered. Thus, the first electrode layer 20 of an electronic ink display is not typically patterned, but rather, is normally a single layer of transparent conductive material. There may be an electrical break between each sense electrode Y0 to Y9, but the break is minimal so as to provide the substantially full coverage of the entire electronic ink layer.

Since the first electrode layer 20 is patterned for sensing, in order to change the image, all electrodes on the first electrode layer 20 are held at the same voltage.

In the present example, the first electrode layer 20 is a layer of fine line conductive metal, such as copper, or a metal mesh layer, which can be patterned with the desired sensor electrode pattern.

In order to sense the position of a touch at the display, a voltage is applied to the drive electrodes and signals are sensed at the sense electrodes. The voltage to change the image held on the electronic ink display, which corresponds to the voltage applied to the drive electrodes for touch sensing, is on the order of about 3 volts. In contrast, a voltage of 25 volts is used to change the image of the electronic ink display. Therefore, the voltage for sensing is typically an order of magnitude smaller than the voltage required to change the image. In addition, in order to change the image held at the display, the image voltage is applied for a period of time on the order of several milliseconds. However, in order to obtain a sense reading, the voltage for sensing may be applied to each drive electrode for several microseconds. This is significantly less time than is used to change the image. In view of the low voltage and short times, applying a voltage for sensing to the drive electrodes of the second electrode layer 40 in order to determine the position of a touch will not alter the image held at the display, since the electronic ink particles only move if a sustained voltage difference (image voltage) is applied between the first and second electrode layers 20, 40 for a longer period of time. In one example, the drive voltages for touch or proximity sensing are offset such that on average over a period comparable to the period for which image voltages are held to change the displayed image, the drive voltages are substantially zero.

In one example, the first electrode layer 20 may form a single layer touch position sensor on which both drive and sense electrodes are patterned. In this example, the first electrode may be formed of ITO, mesh or other suitable materials.

Figure 5:
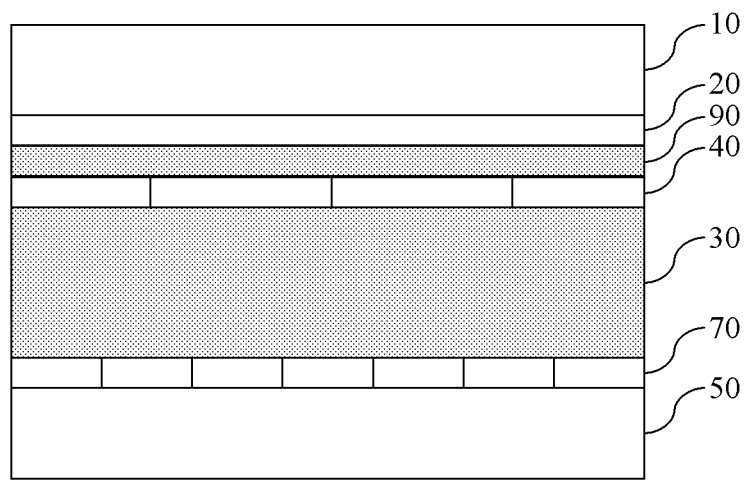
FIG. 5 illustrates schematically another electronic ink display.

In another example, the first electrode layer 20 may be patterned to form the sense electrodes on one side of a substrate 90, and a second electrode layer 40 may be provided on the other side of the substrate 90, as illustrated in FIG. 5. In this example, the second electrode may be comprised of ITO, mesh or other suitable materials.

Figure 6:
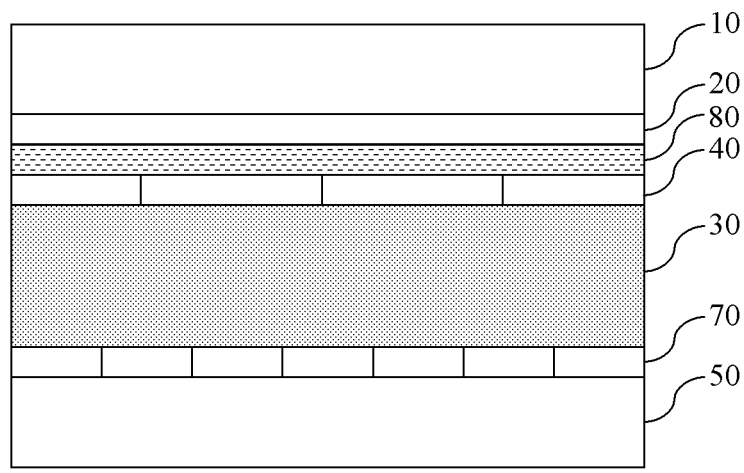
FIG. 6 illustrates schematically another electronic ink display.

In another example as shown in FIG. 6, the touch sensitive display has a first electrode layer 20 patterned to form a plurality of sense electrodes, a second electrode layer 40 provided, via a dielectric layer 80, adjacent to the first electrode layer 20, which is patterned to form a plurality of drive electrodes. The example also has an electronic ink layer 30 provided adjacent the second electrode layer 40, and a pixel electrode layer 70 provided adjacent the electronic ink layer 30. The example may also use an adhesive for the dielectric layer 80.

Figure 7:
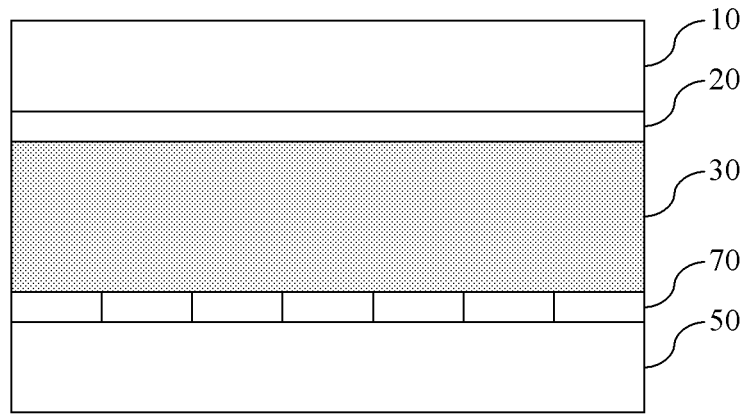
FIG. 7 illustrates schematically another electronic ink display.

In another example as shown in FIG. 7, the first electrode layer 20 forms both the plurality of sense electrodes and the plurality of drive electrodes. An electronic ink layer 30 is adjacent to the first electrode layer 20. A pixel electrode layer 70 is provided adjacent to the electronic ink layer 30.

In the above examples, sensing will be performed at times when the image is not being changed. Touch sensing is performed once the image has been changed. With this approach, the controller can change to a new desired image, which will remain in place. Then the controller applies drive voltage for sensing to the drive electrodes and senses signals from the sense electrodes to detect the position of any touch until a later time when it becomes necessary to change the display to a new image. However, if it is desirable to change the image at about the same time as sensing a touch, then the image drive voltages and cycles of the voltage for touch sensing may be interleaved.

Figure 8:
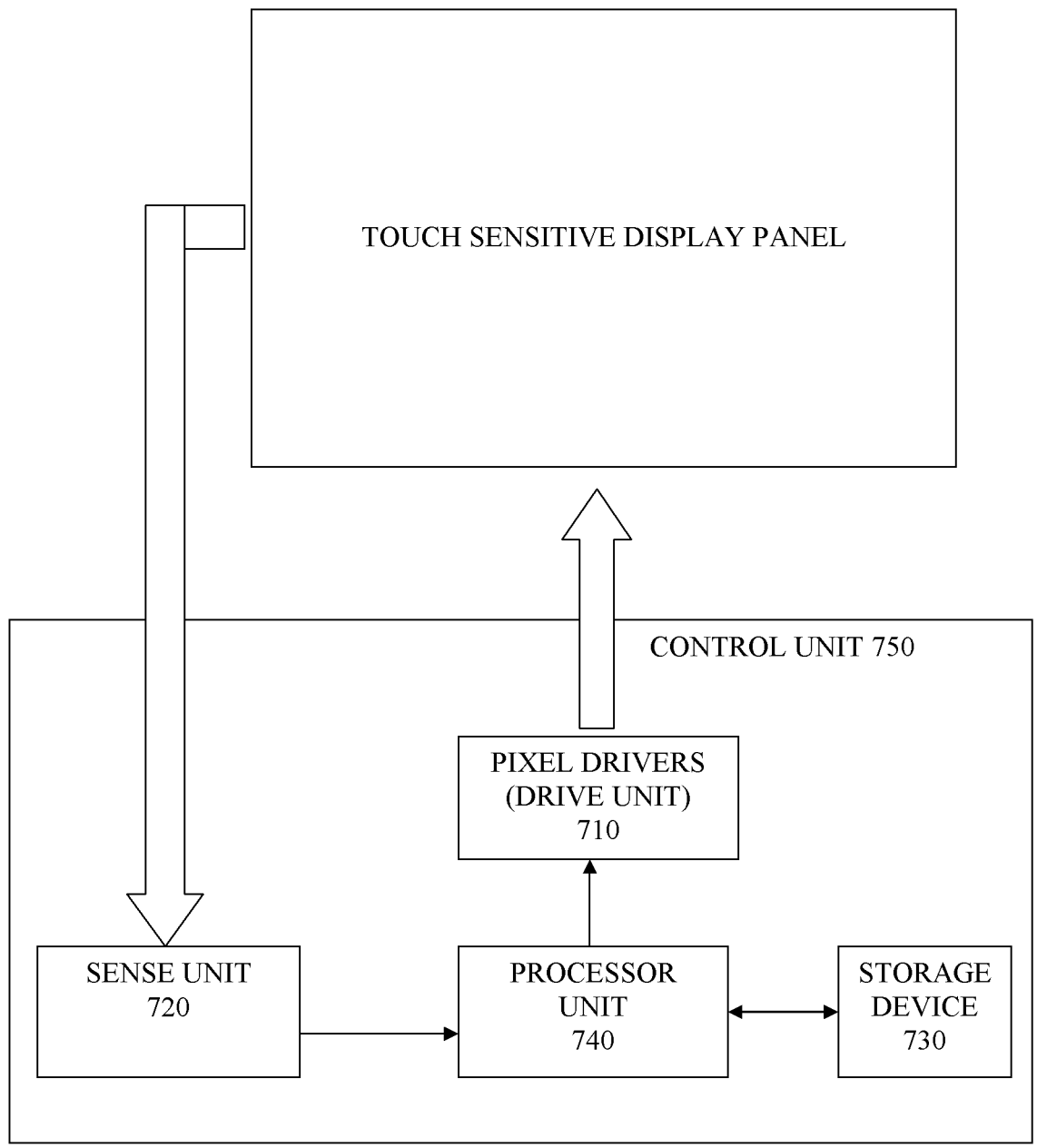
FIG. 8 illustrates schematically the electronics for control and drivers of a touch screen display panel.

It is possible to use the same circuitry to control both changing the image and sensing touches at the display. As is shown in FIG. 8, the control unit 750 may be provided as a single integrated circuit chip such as a general purpose microprocessor, a microcontroller, a programmable logic device/array, an application-specific integrated circuit (ASIC), or a combination thereof. In the illustrated example the control unit 750 includes a drive unit 710, a sense unit 720, a storage device 730 and a processor unit 740.

The sense unit 720 is similar to a sense unit of a mutual capacitance type touch screen. The pixel drivers of unit 710 may be similar to pixel drivers used in other electronic displays.

The processor 740 is capable of controlling the voltages applied across the electrodes to change the display. The processor unit 740 is capable of processing data from the sense unit 720 and determining a position of a touch. In another example, the drive unit 710, sense unit 720 and processor unit 740 may all be provided in separate control units. The processor 740 is also capable of controlling groups of the pixel drivers of unit 710 together in sequence, so that pixel driver electrodes in various groups function as drive electrodes during touch sensing.

An electronic ink display is provided with a touch sensor, but without an increase in thickness of the electronic ink display in one embodiment, and without a significant increase in thickness in another embodiment.

Various modifications may be made to the examples and embodiments described in the foregoing, and any related teachings may be applied in numerous applications, only some of which have been described herein. It is intended by the following claims to claim any and all applications, modifications and variations that fall within the true scope of the present teachings.

The invention claimed is:

1. A touch sensitive display, the display comprising:
a first electrode layer patterned to form a plurality of sense electrodes for capacitive touch sensing;
an electronic ink layer provided adjacent the first electrode layer;
a second electrode layer provided adjacent the electronic ink layer and patterned to form a plurality of drive electrodes for the capacitive touch sensing, the electronic ink layer being substantially between the first electrode layer and the second electrode layer, the second electrode layer being a pixel drive electrode layer forming a plurality of pixel drive electrodes; and
control circuitry configured to apply image voltage across the first electrode layer and the second electrode layer to cause the electronic ink layer to display an image, wherein:
at least one drive electrode of the plurality of drive electrodes comprising multiple rows of pixel drive electrodes of the plurality of pixel drive electrodes, each row comprising multiple pixel drive electrodes of the plurality of pixel drive electrodes, grouped together to operate as the at least one drive electrode such that the multiple pixel drive electrodes of the multiple rows of pixel drive electrodes of the at least one drive electrode operate as the at least one drive electrode,
the plurality of sense electrodes and the plurality of drive electrodes are arranged to create nodes where the drive and sense electrodes overlap, and
the control circuitry is further configured to apply a voltage for capacitive sensing to the plurality of drive electrodes and sense signals from the plurality of sense electrodes in order to determine the position of a touch;
wherein the control circuitry is further configured to apply the image voltage and the voltage for capacitive sensing such that the voltage for capacitive sensing is an order of magnitude smaller than the image voltage.

2. The touch sensitive display of claim 1, wherein the patterned first electrode layer covers substantially the entire electronic ink layer.

3. The touch sensitive display of claim 2, wherein control circuitry is further configured to hold the image voltage across the first electrode layer and the second electrode layer, such that the same voltage is applied to the entire first electrode layer.

4. The touch sensitive display of claim 1, wherein the control circuitry is further configured to individually drive the pixel elements of the pixel drive electrode layer when the control circuitry applies the image voltage across the first electrode layer and the second electrode layer.

5. The touch sensitive display of claim 1, wherein the voltage for capacitive sensing is applied to the drive electrodes and sensed at the sense electrodes.

6. The touch sensitive display of claim 1, wherein the control circuitry is further configured to interleave application of the image voltage and the voltage for capacitive sensing.

7. The touch sensitive display of claim 1, wherein the first electrode layer is comprised of a mesh of conducting lines.

* * * * *